Patented Aug. 1, 1933

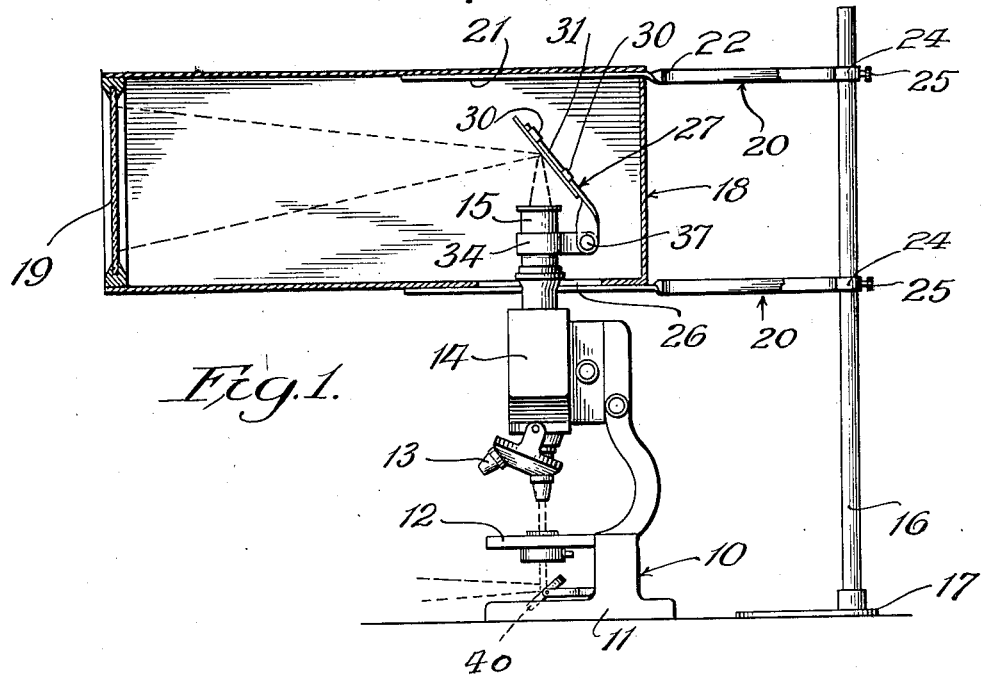
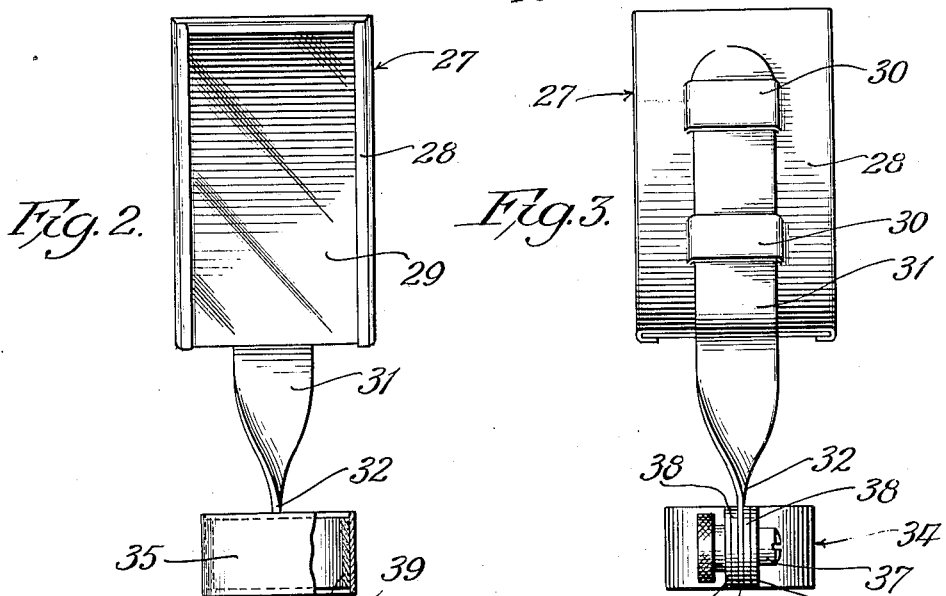
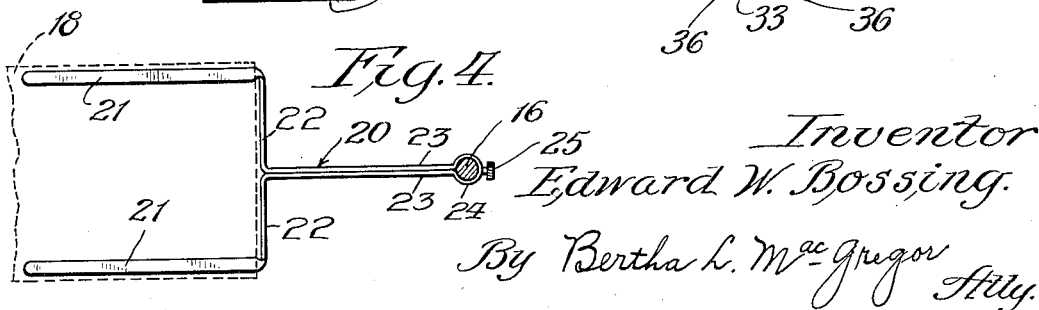

1,920,183

UNITED STATES PATENT OFFICE 1,920,183

MICROSCOPIC PROJECTOR

Edward W. Bossing, Brookfield, Ill.

Application April 2, 1931. Serial No. 527,072

1 Claim. (Cl. 88—24)

This invention relates to microscopic projectors, particularly adapted for microscopically projecting upon a screen, microscopic slides and living materials.

By using an apparatus embodying my invention, it is possible to present the subject matter intended to be observed microscopically, to a number of students or to an entire class at one time, with the use of a single microscope and projection apparatus. Another advantage of the present invention is that it is adapted to be used in combination with regular laboratory equipment, such as a conventional microscope, projection lantern, ring stand and slides and cultures. This is an important economical factor in public educational institutions.

Another advantage of the invention is its simplicity and cheapness, that it is readily applied to any conventional microscope, and is efficient for its intended purpose.

In the drawing—

Fig. 1 is a side elevation, partly in section, of apparatus embodying my invention.

Fig. 2 is an enlarged front elevation of the reflector element of the projection apparatus.

Fig. 3 is a view similar to Fig. 2, showing the reflector in rear elevation.

Fig. 4 is a plan view of a detail of the construction.

In that embodiment of the invention shown in the drawing, a conventional microscope is indicated as a whole at 10, which usually comprises a base 11, stage 12, objectives 13, tube 14 and eye piece 15.

Any desired upright support such as a ring stand 16 having a base 17 may be placed in juxtaposition to the microscope. The purpose of the stand 16 is to support a housing 18 in desired position relatively to the microscope 10. The housing comprises top, bottom and two longitudinally extending side walls as well as front and rear end walls. In the front wall is mounted a ground glass screen 19. The housing 18 may be made of any desired material and may be provided with rearwardly projecting links or rods for mounting the housing in a horizontal position on the stand 16. However, I prefer to use an extremely light, cheap housing which may be made of paper board. In order to strengthen and support the paper board housing and to secure it to the stand 16, I prefer to use a metal strap member 20 at the top of the housing 18 and another at the bottom. As best shown in Fig. 4, the device 20 comprises a single strip of metal bent to form two spaced apart, longitudinally extending arms 21, inwardly turned portions 22, and parallel, rearwardly extending members 23 joined by a ring portion 24. The arms 21, 21 of the upper connecting device 20 are preferably inserted into the housing 18 beneath the top wall thereof, with the parallel arms 23 and ring 24 extending rearwardly toward the stand 16. An adjusting screw 25 secures the ring member 24 to the stand 16. The lower connecting device 20 has been shown with its arms 21, 21, supporting the bottom of the housing, but said arms may be either above or below the bottom wall of the housing and if desired, may be fastened to the housing by any suitable means. The bottom wall of the housing is provided with a slot 26 which enables the housing to be placed over the upper portion of the microscope, and the slot 26 is sufficiently long to permit the microscope to be moved forwardly relatively to the housing, to alter the projection field.

A removable and adjustable reflector device, indicated as a whole at 27 in Fig. 1, is adapted to be mounted on the upper part of the microscope 10. It comprises a frame 28 in which is mounted a mirror 29. The rear wall of the frame 28 is slit and the metal 30 between the slits is pressed outwardly to permit of the insertion of an arm 31 which consists of an elongated flat piece of metal twisted at 32 to form a lower end portion 33 at right angles to the upper part which is inserted under the metal 30. A clamping member 34 for mounting the arm 31 on the microscope consists of a strip of metal curved to form a ring 35 and parallel rearwardly directed ears 36 apertured to receive the nut and bolt 37, the bolt passing through the end of the part 33 of the arm 31, between the clamp ears 36. Preferably washers 38 are placed between the ears 36 and the end 33 of the arm 31, and a felt band 39 may be inserted between the ring 35 and the microscope. The ring portion 35 surrounds the upper part of the microscope below the eye piece 15 and the mirror 29 mounted in its frame on the arm 31 may be held in any desired adjusted position relatively to the microscope 10, by means of the bolt and nut 37 which adjustably secure the arm 31 in position on the clamp.

In using the microscopic projector of the present invention, any desired projection lantern may be used to cast rays of light on the reflector 40 of the microscope, which rays are deflected upwardly through the subject matter to be microscopically shown, through the eye piece 15 to the mirror 29, and from thence deflected and projected to the ground glass 19. When the apparatus is used without the housing 18, the image is projected on to a screen instead of the ground glass. Thus one equipment in conjunction with the two pieces, the housing and reflector, may function as a two purpose equipment.

Changes may be made in details of construction without departing from the scope of my invention and I do not intend to be limited to the exact form shown and described except as set forth in the appended claim.

I claim—

A microscopic projection apparatus, comprising a reflector adapted to be removably mounted on a microscope in juxtaposition to the eye piece of the microscope, and a housing, having a ground glass screen in one wall, for enclosing the reflector and eye piece of a miscroscope, said reflector comprising a frame, a mirror mounted in the frame, a clamp consisting of a ring member for engaging the upper part of a microscope and a pair of ears protruding from the ring, an arm, the mirror frame being mounted on one end of the arm and the opposite end of the arm being apertured and located between the ears on the clamp and a bolt extending through said ears and said arm for simultaneously attaching the clamp to a microscope and adjusting the reflector arm relatively to the eye piece.

EDWARD W. BOSSING.